May 16, 1967 D. W. DANIEL ET AL 3,319,526
GEAR SHAVING MACHINE
Filed Oct. 14, 1965 2 Sheets-Sheet 2

INVENTORS
DAVID W. DANIEL
ARTHUR B. BASSOFF
BY
Whittemore
Hulbert & Belknap
ATTORNEYS

3,319,526
GEAR SHAVING MACHINE
David W. Daniel, Birmingham, and Arthur B. Bassoff, Oak Park, Mich., assignors to National Broach & Machine Company, Detroit, Mich., a corporation of Michigan
Filed Oct. 14, 1965, Ser. No. 495,814
14 Claims. (Cl. 90—1.6)

The present invention relates to a gear shaving machine, and more particularly to a machine designed to effect a shaving operation by rotating a gear in mesh with a gear-like tool with their axes crossed, and relatively moving the gear and gear-like tool in a direction perpendicular to the axes of both to cause the axes to approach and to remove material from the teeth of the gear by cutting edges provided on the teeth of the gear-like tool.

It is an object of the present invention to provide a machine for shaving gears as described in the preceding paragraph in which the relative motion between the gear and gear-like tool, except for the meshed rotation thereof, is limited to direct approach and separation in a direction perpendicular to the axes of both the gear and tool, and in which feeding means are provided including a link movable into substantial parallelism with the direction of relative movement between the gear and tool to provide for a decrease in the rate of approach between the axes of the gear and tool.

It is a further object of the present invention to provide feeding mechanism for a gear shaving machine of the character described including a toggle feeding mechanism.

It is a further object of the present invention to provide toggle feed mechanism for a gear shaving machine and toggle actuating mechanism comprising an arm rigidly connected to one link of the toggle mechanism, and actuating means connected to the arm.

It is a further object of the present invention to provide feed mechanism as described in the preceding paragraph comprising in addition speed regulating mechanism connected to the arm.

It is a further object of the present invention to provide feed mechanism as described in the preceding paragraph in which the speed regulating mechanism comprises adjustable hydraulic escapement means.

It is a further object of the present invention to provide feed mechanism as described in the preceding paragraph comprising adjustable cycle timing mechanism effective in cooperation with the speed regulating mechanism to determine a dwell period during which the gear shaving tool remains at full depth in meshed engagement with the gear.

Other objects and features of the invention will become apparent as the description proceeds, especially when taken in conjunction with the accompanying drawings, illustrating a preferred embodiment of the invention, wherein.

Figure 1:
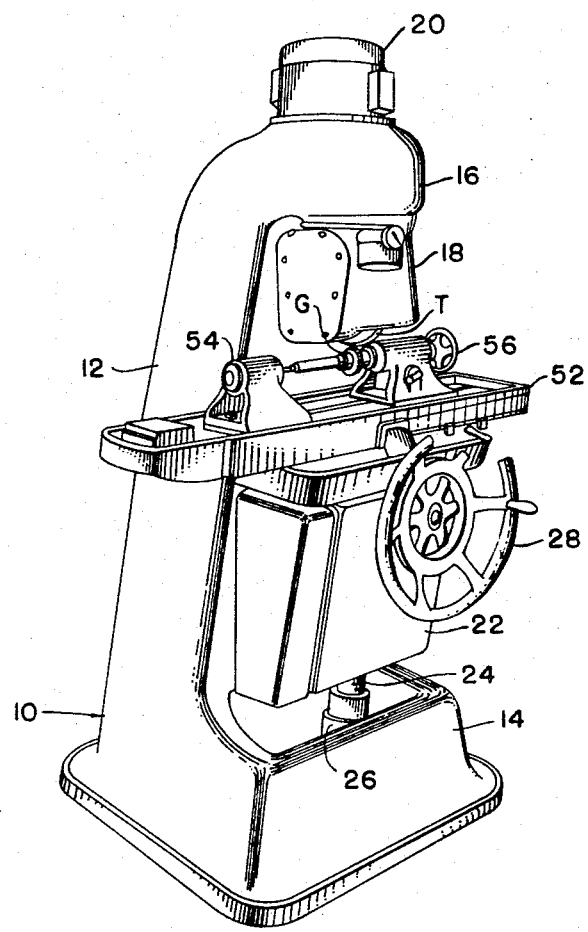
FIGURE 1 is a perspective view of a gear shaving machine constructed in accordance with the present invention.

Referring first to FIGURE 1, the gear shaving machine comprises a frame 10 including a column 12, a forwardly extending base 14, and a forwardly extending overhanging portion 16. A tool support 18 is suspended from the underside of the frame portion 16 and is carried for angular adjustment about a vertical axis. A rotary gear shaving tool T is carried by the tool support 18 and is adapted to be driven in rotation by suitable mechanism including a motor 20.

Mounted at the front of the frame and movable vertically in ways provided at the front face of the column 12 is a knee 22. Means are provided for effecting vertical movement of the knee and this means comprises a feed screw 24 rotatable in a feed nut carried in nut supporting means indicated at 26 fixed to the base 14. The feed screw 24 may be rotated by a hand wheel 28 by mechanism better seen in FIGURES 2 and 3, to which reference is now made.

Rotation of the feed screw 24 is accomplished from a worm gear 30 keyed or otherwise secured thereto, which in turn is rotated by a worm 32 directly connected to the shaft of the hand wheel 28.

Bearing means indicated at 34 are provided above the worm gear 30 and support a two-part block assembly 36. Interconnected between the block assembly 36 and the knee or vertical slide 22 is toggle mechanism comprising a first link 38 pivoted at its lower end by a pivot pin 40 to the block 36 and at its upper end by the pin 42 to the upper link 44. The link 44 in turn is connected by a pin 46 to a member 48 engaging the underside of a portion 50 of the knee 22. The knee 22 at its upper end also includes a laterally elongated table portion 52 which supports the head and tailstocks 54 and 56, between which a work gear G is mounted for rotation.

The link 44 is in the form of an elongated member having lever arms 58 and 60.

Carried by the knee 22 for vertical movement therewith is toggle actuating mechanism comprising a fluid piston and cylinder device indicated generally at 62 including a piston rod 64 connected by a link 66 to the outer end of the arm 58. An adjustable abutment screw 68 is carried by the knee 22 and determines the stroke of the piston in the piston and cylinder device 62. Fluid, preferably compressed air, is admitted to the cylinder at opposite sides of the piston under control of a reversing valve 70 which in turn is actuated by an adjustable timer 72 to determine the interval between application of air in a direction to elevate the knee 22 and reversal of the air supplied to the cylinder to cause the knee to move downwardly. It will be recalled of course that upward movement of the knee results in approach between the axes of the gear G and the tool T, and it will be apparent that this direction of relative movement is along a path perpendicular to the axes of the gear and tool.

Means are provided for controlling the rate of movement of the piston connected to the piston rod 64 in the direction which causes upward movement of the knee. This mechanism comprises a hydraulic escapement cylinder 74 carried by the knee and including a piston (not shown) connected to a piston rod 76 having a head 78 engageable with a roller 80 carried at the outer end of the arm 60. The hydraulic escapement cylinder includes a variable restriction (not shown) adjustable to control the rate at which the piston rod 76 may be depressed.

A second adjustable abutment screw 82 is provided for controlling clockwise swinging movement of the link 44 and its arms 58 and 60.

The link 38 includes an abutment shoulder 84 engageable with a cooperating surface at the lower end of the knee supporting member 48 to limit counterclockwise swinging movement of the link 44 and corresponding clockwise swinging movement of the link 38.

Figure 2:
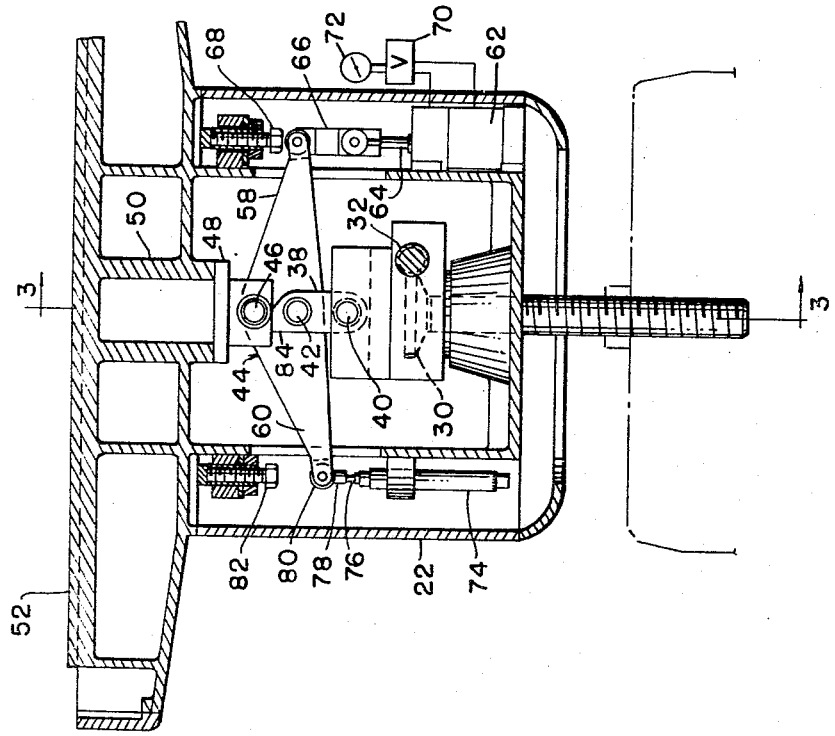
FIGURE 2 is an enlarged sectional view on the line 2—2, FIGURE 3.
Figure 3:
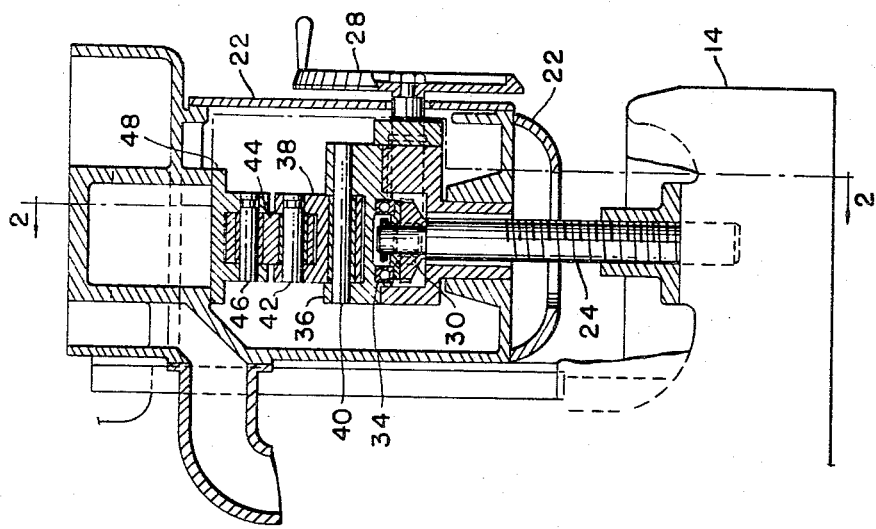
FIGURE 3 is an enlarged sectional view on the line 3—3, FIGURE 2.

In operation the adjustable restriction in the hydraulic cylinder 74 is adjusted to control the rate at which the piston and cylinder device 62 is permitted to rock the link 44 to the aligned position illustrated in FIGURE 2. Due to the fact that elevation of the knee is the result of movement of toggle mechanism into a position in which the links thereof are in substantial alignment and substantially parallel to the direction of movement of the knee 22, it will of course be apparent that the vertical movement of the knee takes place at a diminishing speed and that this speed approaches zero along a sine curve so that the final movement of the link 44 into the position illustrated in FIGURE 2 produces minimum vertical movement. In addition to the gradually decreasing velocity or speed of upward movement of the knee, a dwell period may be provided of selected duration by appropriate adjustment of the valve reversing timer 72. Thus, if the timer is set for a cycle of six seconds for example, and the variable restriction in the hydraulic cylinder 74 is set to require three seconds for the toggle actuating mechanism to effect full rocking movement of the link 44 and its arms 58 and 60, then a dwell period of three seconds is provided. Upon expiration of this dwell period the valve 70 is actuated to reverse the direction of air to the piston and cylinder device 62 and the knee or slide 22 will move downwardly at a rate determined by the rate at which air is permitted to flow out of the piston and cylinder device 62.

From the foregoing it will be observed that irrespective of the average rate of infeed between the tool and gear, the relative movement between these parts as the tool approaches and reaches full depth is at a continuously decreasing speed. With this arrangement a smoother action is obtained, the initial upfeed being relatively rapid and the final feed to full depth being accomplished at a much slower and decreasing velocity. Moreover, the apparatus described provides for a selected interval of dwell followed by rapid separation between the gear and tool.

In practice, it is desirable for the links 38 and 44 constituting the toggle mechanism, to move slightly over center and to remain in this position during the dwell period. This insures accurate location of the slide during the dwell period.

The drawings and the foregoing specification constitute a description of the improved gear shaving machine in such full, clear, concise and exact terms as to enable any person skilled in the art to practice the invention, the scope of which is indicated by the appended claims.

What we claim as our invention is:

1. A gear shaving machine comprising a frame, a first support on said frame for a first rotatable gear-like member, a slide on said frame, a second support on said slide for a second rotatable gear-like member in mesh with the first gear-like member with their axes crossed, means for driving one of said gear-like members in rotation, and feed means for moving said slide in a direction perpendicular to the axes of both gear-like members, said feed means comprising a link connecting said frame and slide and movable into substantial alignment with the direction of movement of said slide as said gear-like members move into the position of minimum spacing between the axes thereof.

2. A machine as defined in claim 1 in which said feed means comprises a second link connecting to said first mentioned link and constituting toggle mechanism therewith.

3. A machine as defined in claim 2, one of said links having a laterally extending arm, and actuating mechanism connected to the end of said arm remote from said one link.

4. A machine as defined in claim 2, one of said links having laterally extending arm means, actuating means connected to said arm means, and adjustable timing means connected to said arm means controlling the rate of approach between the axes of said gear-like members.

5. A machine as defined in claim 4, said timing means comprising a hydraulic escapement device.

6. A machine as defined in claim 5, said actuating means comprising a pneumatic piston and cylinder device.

7. A machine as defined in claim 6 comprising means for adjusting the rate of separation of said gear-like members.

8. A machine as defined in claim 7 comprising adjustable abutment means to limit movement of said slide to determine the spacing of the said axes at the position of full depth.

9. A machine as defined in claim 8, and timing means controlling the interval of application of pressure to said piston and cylinder device to determine with said hydraulic escapement device the duration of infeed and the duration of dwell at full depth.

10. A gear shaving machine comprising a frame, a first support on said frame for a first rotatable gear-like member, a slide on said frame, a second support on said slide for a second rotatable gear-like member in mesh with the first gear-like member with their axes crossed, means for driving one of said gear-like members in rotation, feed means for moving said slide on said frame in a direction perpendicular to the axes of both of said gear-like members, said feed means comprising feed screw mechanism connected to said frame, a feed block connected to said feed screw mechanism for movement relative to said frame thereby in a direction parallel to the direction of movement of said slide, toggle mechanism connected between said block and slide, said toggle mechanism comprising a pair of links movable into substantial alignment as said gear-like members move into the position of minimum spacing between the axes thereof and toggle actuating mechanism carried by said slide.

11. A machine as defined in claim 10 comprising speed regulating mechanism connected to said toggle mechanism.

12. A machine as defined in claim 11, said toggle actuating and said speed regulating mechanism comprising an arm rigidly connected to said toggle mechanism.

13. A machine as defined in claim 11, said toggle actuating mechanism comprising a fluid actuated piston and cylinder device connected between said slide and said arm.

14. A machine as defined in claim 11, said speed regulating mechanism comprising a hydraulic piston and cylinder device, and a variable restrictor connected thereto to provide for adjustment of the speed of movement of said slide.

References Cited by the Examiner
UNITED STATES PATENTS
2,435,405   2/1948   Praeg ---------------- 90—1.6

WILLIAM W. DYER, Jr., *Primary Examiner.*

G. A. DOST, *Assistant Examiner.*